Figure 1:
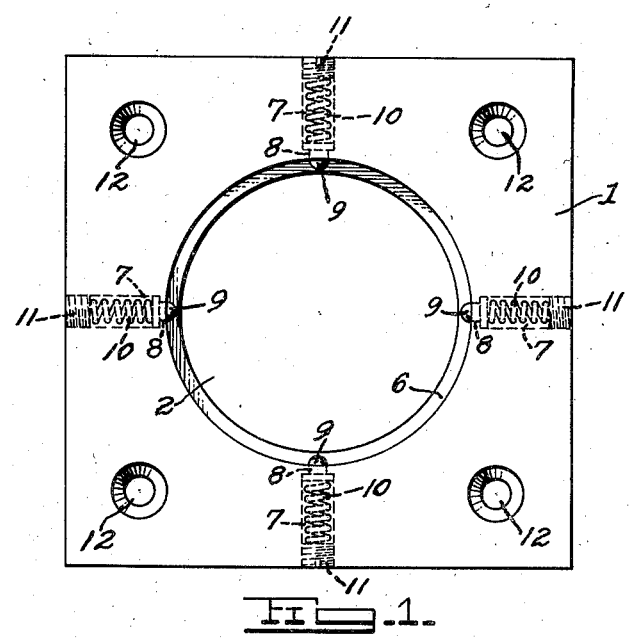
Figure 2:
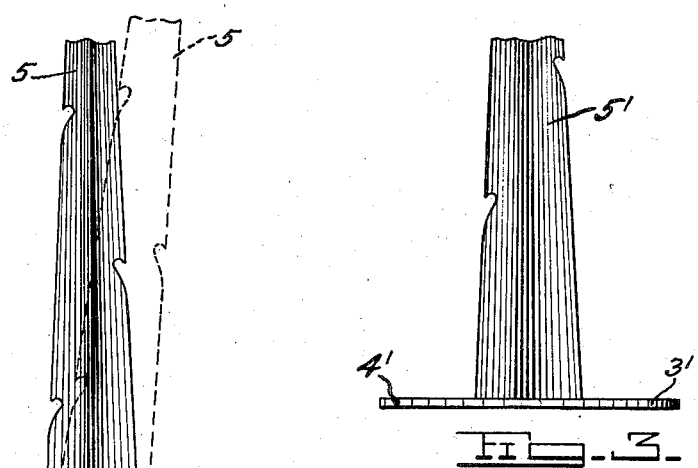
Figure 3:
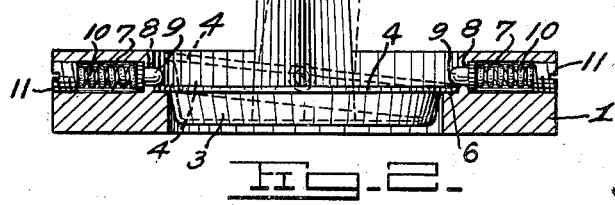

July 27, 1937.   G. E. GAUS ET AL   2,088,237
HOLDER FOR BALE IDENTIFICATION TAGS
Filed Feb. 9, 1935

INVENTORS
G. E. GAUS
W. L. BOWES

BY ATTORNEY

Patented July 27, 1937

2,088,237

UNITED STATES PATENT OFFICE 2,088,237

HOLDER FOR BALE IDENTIFICATION TAGS

George E. Gaus, Washington, D. C., and William L. Bowes, Pensacola, Fla., dedicated to the free use of the Public Application February 9, 1935, Serial No. 5,786

2 Claims. (Cl. 100—14)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to us of any royalty thereon.

We hereby dedicate the invention herein described to the free use of the public, to take effect upon the granting of a patent to us.

Our invention relates to that class of holders employing means capable of separable connection with an identification tag assembly, comprising a substantially rigid anchoring means firmly affixed to a substantially rigid tag head.

Our general object is to provide a device of the above nature employing two coacting members that are capable of easy connection and separation, one of which, the tag holder, is adapted to be carried by the baling press, and the other, the identification tag, by the baled material.

In order to carry out the purposes of our invention, reference is to be had to the peculiar combination and arrangement of parts as shown in the accompanying drawing, being a preferred embodiment of our invention, forming a part of this specification in which similar numerals refer to similar parts throughout the several views.

Figure I is a plan view of our tag holder.

Figure II is a section through the center of our tag holder illustrating the method of engagement of the head of the identification tag assembly with our holder, the anchoring means being shown in fragmentary elevation.

Figure III illustrates a modification of the tag head of the identification tag assembly adapted for use with our tag holder.

Referring to the drawing, plate 1, is provided with a socket 2 adapted to receive tag head 3 of the tag assembly 3—5.

The tag assembly 3—5 is provided with a tag head 3 having a substantially rigid flange-like rim 4, said tag head being firmly affixed to a substantially rigid V-form anchoring means 5.

The socket 2 has a recessed step 6 formed in its upper portion. It is obvious the contracted lower portion of socket 2 is not essential for proper coaction of our tag holder with the type tag head illustrated in Figure III. The diameter of socket 2 is greater than the diameter of tag head 3, thus permitting its free entry into socket 2 without periphractic binding by the substantially vertical side walls of recessed step 6.

Radial bores 7 communicating with step 6 by means of apertures 8, contain plungers 9, springs 10, and plugs 11.

Plungers 9, normally project slightly forward from apertures 8. Springs 10 are interposed between the rear end of plungers 9 and plugs 11 and normally retain the plungers 9 forwardly projected from apertures 8. The projecting extremities of plungers 9 have contours which permit contraction of the tension springs 10 and retraction of the plungers 9 within bores 7 and apertures 8 when pressure is applied downwardly to the upper surfaces, or upwardly to the under surfaces of said respective extremities.

For the purpose of explanation of the method of operation of our device in connection with an identification tag as covered by the U. S. Letters Patent No. 1,922,799, issued August 15, 1933, tag assembly 3—5 as illustrated in the drawing will be discussed.

Our invention may be practiced by mounting plate 1, by means of screws (not shown) in screw holes 12, on the movable or fixed pressing platen of a conventional bale press-box (not shown), which position will permit the affixing of identification tags, as covered by U. S. Letters Patent No. 1,922,799. The operation of our device will be described as being mounted on the movable pressing platen of the conventional bale press-box. When plate 1 is thus mounted engagement of tag assembly 3—5 is effected by inserting tag head 3 within the confines of socket 2 and step 6, thence applying pressure downwardly on anchoring means 5, and/or tag head 3, causing the flange-like rim 4 of tag head 3 to bear forcibly against the projecting extremities of plungers 9.

The proportions of the related parts of the tag head and our holder are such that continued forcible pressure of tag head 3 against the projecting extremities of plungers 9 will cause the plungers 9 to yield enough to permit tag head 3 to ride over the projecting ends of plunger 9, pressing the plungers 9 inward against the tension springs 10 a sufficient distance to permit the tag head 3 to pass downwardly and thence beneath the extremities of plungers 9, ultimately coming to rest on the tread portion of step 6. With nothing to obstruct the forward movement of the plungers 9, the tension springs 11 push the plungers 9 forward, returning said plungers to the normally projected position within socket 2 having rim 4 of tag head 3 confined in said socket between the tread of step 6 and the projecting portions of said plungers. The bi-lateral symmetrical contours of the projecting extremities of the plungers 9 permit automatic yielding of said plungers by the coupling and uncoupling movements imparted to tag head 3. The tension of springs 10 against plungers 9 offer sufficient resistance to appreciably oppose uncoupling of the tag head 3 from the socket 2 in the absence of effort exerted to accomplish that purpose. Having tag head 3 in engagement with plate 1, as hereinabove-described, at the inception of the process of baling, the bale covering is forced downwardly on anchoring means 5 and into contact with plate 1. The material to be baled is introduced into the bale press-box and the process of baling is performed in the conventional manner. The customary process of baling effects the envelopment and impaction of said tag anchoring means 5 with the material being baled, thereby arresting the removal of the tag assembly 3—5 from the confines of the baled material.

Application of force to tag anchoring means 5 causing the uncoupling of tag head 3 from our holder, would result in the normal function of removing a completed bale having tag assembly 3—5 affixed thereto, from a conventional baling press. Plate 1 remains attached to the baler pressing platen.

As a modification of our tag assembly, reference is had to Figure III, wherein tag assembly 3'—5' is provided with a plate-like tag head 3' having a substantially vertical rigid rim 4'. Tag head 3' is firmly affixed to a substantially rigid V-form anchoring means 5'. The operation of this assembly (3'—5') with our device is substantially the same as the assembly 3—5 illustrated in Figure II, herein described.

It is obvious that minor changes may be made in the details of construction and the arrangement of the parts without departing from the spirit of the invention as set forth in the appended claims.

Having thus described our invention, what we claim for Letters Patent is:

1. A tag holder adapted to be interiorly affixed to a platen of a baler, comprising a plate having a socket member formed therein adapted to freely receive the head of a nail-like identification tag; a plurality of latching members housed within said plate and communicating with the socket member; tension means adapted to engage said latching members; and retention members adapted to engage said tension means, said latching members adapted to detachably secure the tag head during engagement of the tag with the material as the same is being formed into a bale and adapted to ultimately permit the release of the tag head from said holder upon completion of the normal process of baling.

2. An identification device for securing nail-like identification tags to loose material during the process of baling, comprising a plate-like tag head holder having a latch-bolted socket receiving member formed therein; the said plate-like tag head holder adapted to be affixed interiorly of the platen of a baler; said tag head holder adapted freely to receive and to engage, and also to retain the tag head in a plane substantially coincident with one of the outer surfaces of the loose material being baled and at a normal to the plane of movement of said material during engagement of said tag with said material, and further adapted to ultimately permit the release of the tag head from said holder upon removal of the baled material from said baler.

GEORGE E. GAUS.
WILLIAM L. BOWES.